Dec. 2, 1930. J. L. ALLEN 1,783,869
GASKET CUTTING MACHINE
Filed July 3, 1929 2 Sheets-Sheet 2
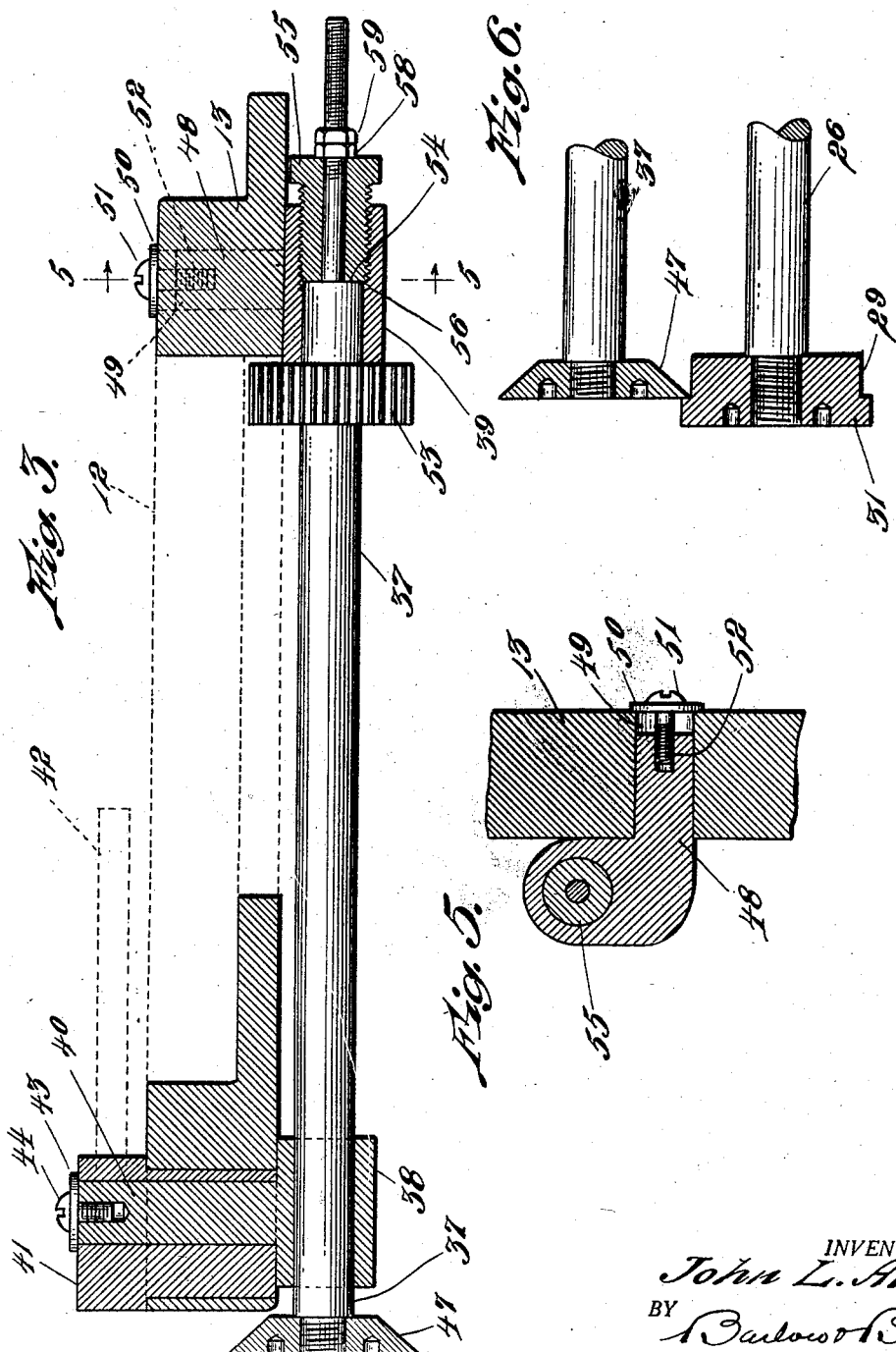
INVENTOR.
John L. Allen
BY
Barlow & Barlow
ATTORNEYS.

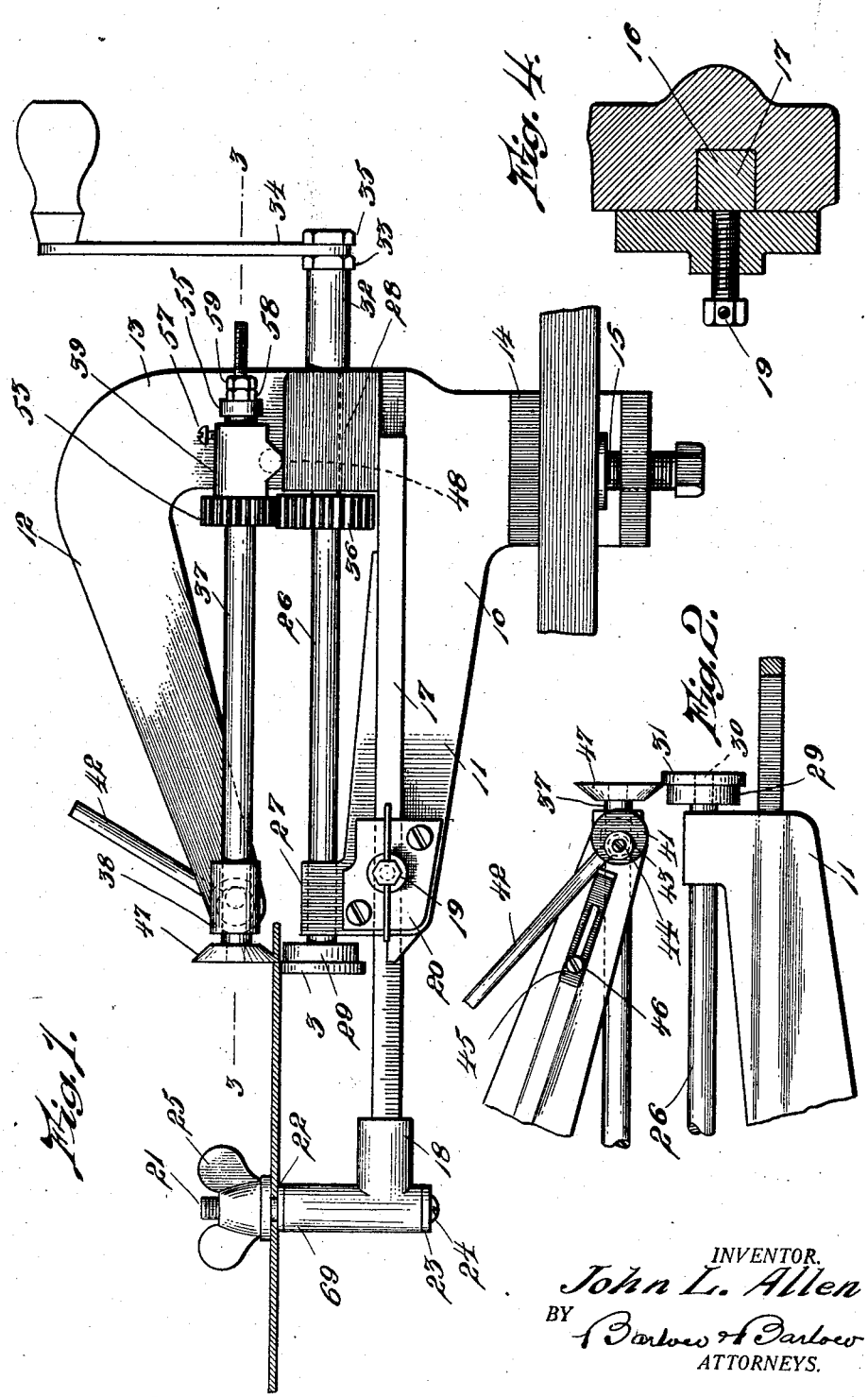

Patented Dec. 2, 1930

1,783,869

UNITED STATES PATENT OFFICE

JOHN L. ALLEN, OF NEW BEDFORD, MASSACHUSETTS

GASKET-CUTTING MACHINE

Application filed July 3, 1929. Serial No. 375,735.

The present invention relates to sheet cutting devices, and has particular reference to devices for cutting gaskets.

The object of the invention is to provide a novel machine for cutting gaskets from sheet stock.

A second object is to provide a device the work of which may be arranged to be cut in annular or irregular shapes.

Another object is to provide a gasket cutter which will produce a cut perpendicular to the plane of the gasket.

A further object is to provide a gasket cutter having readily replaceable cutting elements.

A still further object is to simplify the construction and arrangement of a gasket cutter of this type.

Other objects and advantageous features will be readily apparent from the detailed description following, in conjunction with the accompanying drawings, wherein:

Fig. 1 is an elevation of the novel cutter with the cutting elements in operative position on a piece of work.

Fig. 2 is a detail view of the cutter separating mechanism;

Fig. 3 is a section on the line 3—3 of Fig. 2;

Fig. 4 is a detail section showing the locking mechanism for the adjustable gasket retainer;

Fig. 5 is a section on the line 5—5 of Fig. 3, showing the pivotal elements for the upper cutter; and Fig. 6 is a detail sectional view through the cutters.

It has heretofore been difficult for a purchaser of sheet gasket material to cut accurate gaskets of ring form, or with interior openings, from the purchased material. I have devised a small portable machine of simple and inexpensive construction which may be set in a vise or clamped to a table or the like, and which has two cutters rotatable to perpendicularly cut a gasket or the like and at the same time move the work, the upper cutter being movable away from the lower cutter to permit the insertion therebetween of the sheet of material to be cut. I have also provided adjustments for accurately positioning the cutter elements with respect to each other, and have positioned an adjustable center or work support for use in cutting annular gaskets of any desired radius; and the following is a detailed description of one structural embodiment of a cutter for carrying out the principles of my invention.

Referring to the drawings, the cutter frame 10 is generally U-shape in form, with a base 11, an upper arm 12, and an upright portion 13 joining the base and the upper arm. The base 11 is preferably provided with a recess 14 for receiving the edge of a table or the like, a clamp screw 15 manually operated, serving to securely clamp the cutter in place. If desired, a depending portion of the base may be inserted in a vise.

Slidably mounted in a longitudinal recess 16 in the base, said recess being preferably square in cross section, is a rod 17 of corresponding section, having a centering element 18 securely fixed at the free end thereof, the rod 17 being graduated as shown in Fig. 1 and releasably locked in position by a manually operated locking clamp 19 engaging one side of the rod 17 and extending through a plate 20 affixed to the base 11 by screws or the like.

The centering element 18 has a tubular support 69 within which a centering spindle 21 is mounted, a collar 22 fixed on the spindle contacting with the upper end of tube 69, and a second collar 23 contacting with the lower end of tube 69, the assembly being secured by means of a screw 24 having its head engaging the collar 23 and its stem screw threadedly engaging a threaded recess in the lower end of the spindle to rotatably mount the spindle within the tube 69. The upper end of the spindle has the usual centering point, and is screw threaded to receive a wing nut 25 for clamping a sheet of material on the spindle.

As shown in Fig. 1, a shaft 26 is rotatably secured in the cutter frame, one end being mounted in a bearing 27 on the base 11, and the other end in a bearing 28 on the upright 13. A cutter receiving head 29 is positioned at one end of shaft 26, the shaft having a screw-threaded tip 30 for receiving the lower cutter element 31 which is preferably of the roller type. A tubular spacer 32 is positioned at the other end of shaft 26, which is also threaded to receive a spacer nut 33, a handle 34 which threads on the end, and a lock nut 35. A spur gear 36 is keyed to the shaft 26 adjacent the bearing 28, for a purpose hereinafter described.

A shaft 37 is rotatably mounted in normally parallel relation to shaft 26, in a bearing 38 positioned at the end of upper arm 12, and a bearing 39 mounted in the upright 13. Both bearings 38, 39 are movable; bearing 38 is integral with a pin 40 (see Fig. 3), which pin is eccentrically mounted within a bushing 41 which itself is rotatable within arm 12 upon movement of a manually operated rod 42 to separate the cutters. An abutment plate 43, secured to the pin 40 by a screw or the like 44, holds this bearing assembly in position; a slidable stop 45, adustably secured to the arm 12 by a screw or the like 46, limits the downward movement of rod 42, and therefore, adjustably limits the downward movement of the upper cutter element 47, which is preferably cone-shaped, and is screw threadedly mounted on the end of rod 37.

Referring to Figs. 3 and 5, the bearing 39 has a laterally extending pivot pin 48, rotatably mounted in a recess 49 in the upright 13; a stop plate 50 cooperates with a screw or the like 51 which engages a screw-threaded recess 52 in the end of the pin to secure the bushing in place. Shaft 37 has a spur gear 53 keyed thereto adjacent the bearing 39, and in mesh with spur gear 36; the end of the shaft 37 is reduced to provide a shoulder 54 against which a tubular bushing 55 presses, the bushing 55 being larger than the reduced end and being in engagement with the correspondingly screw-threaded recess 56 in bearing 39, a lock screw 57 in the bearing 39 serving to keep the bushing in adjusted position. Two lock nuts 58, 59 engage the threaded end of the rod 37.

If desired, the cutters may be faced the other way, or the cone-shaped cutter and the roller cutter may be interchanged. To ensure a perpendicular cut, the cutting edge of the upper cutter is set to be the same distance from the axis of the shaft 37 as the pivot of the shaft 37.

The operation of the improved cutter is as follows:

An upward movement of lever 42 swings the bearing 38 and lifts the upper cutter away from the lower cutter. A gasket sheet is now positioned on the spindle tip 21 and the rod 17 is adjusted to give the desired outside diameter. The lever 42 is now lowered, and a rotation of crank handle 34 rotates both cutters and rotates the work about the spindle 21 to form a true circular gasket. The lever 42 is now raised, and rod 17 is moved inwardly to obtain the desired width of annular gasket; the lever is lowered, and the rotation of the crank handle again rotates the cutters and the work and produces an accurate annular gasket of the desired dimensions.

If an irregular gasket is desired, the rod 17 is removed, and the gasket sheet is manually moved to follow the desired shape, the two cutter elements grip the material sheet, and positively feed the sheet during cutting, the hand of the operator functioning to guide the direction of the cut.

While I have described one embodiment of the novel cutter, such changes in structure and arrangement as appear desirable may obviously be made, within the scope of the invention as defined in the appended claims.

I claim:

1. In a cutting machine, a U-shaped frame having two legs and a base, a shaft rotatably mounted in fixed bearings and extending along one leg, a cutter element on the end thereof, a second rotatable shaft extending along the other leg, a second cutter element on one end of said second shaft in operative contiguity to said first cutter element, a bearing for the other end of said second shaft pivotally mounted in said frame, a movable bearing for the cutter end of said shaft, an eccentric rotatably mounted at the end of said other leg, means operatively connecting said eccentric to said movable bearing, means for rotating said eccentric to move said bearing and swing said second shaft on its pivotally mounted bearing, whereby said second cutter element is movable with respect to said first cutter element, means for rotating said shafts, and means for adjusting one of said shafts axially.

2. In a cutting machine, a U-shaped frame having two legs and a base, a shaft extending along one leg and rotatably mounted in bearings fixed on said frame, a cutter element on the end thereof, a second rotatable shaft extending along the other end, a second cutter element on one end of the second shaft in operative contiguity to the first cutter element, a bearing for the other end of the second shaft pivotally mounted in said frame, an eccentric sleeve rotatably mounted in said frame at right angles to the second shaft and adjacent the cutter end thereof, a bearing for the cutter end of the second shaft slidable thereon, a pin eccentrically mounted in the eccentric sleeve and connected to the slidable bearing, means for rotating the eccentric sleeve to move the slidable bearing and swing the second shaft on its pivotally mounted bearing, whereby the second cutter element is moved with respect to the first cutter element, and means for rotating the shafts.

3. In a cutting machine, a U-shaped frame having two legs and a base, a shaft extending along one leg and rotatably mounted in bearings fixed on said frame, a cutter element on the end thereof, a second rotatable shaft extending along the other end, a second cutter element on one end of the second shaft in operative contiguity to the first cutter element, a bearing for the other end of the second shaft pivotally mounted in said frame, an eccentric sleeve rotatably mounted in said frame at right angles to the second shaft and adjacent the cutter end thereof, a bearing for the cutter end of the second shaft slidable thereon, a pin eccentrically mounted in the eccentric sleeve and connected to the slidable bearing, manually operable means for rotating the eccentric sleeve to move the slidable bearing and swing the second shaft on its pivotally mounted bearing, whereby the second cutter element is moved with respect to the first cutter element, means for limiting the movement of the manually operable means, and means for rotating the shafts.

In testimony whereof I affix my signature.

JOHN L. ALLEN.